United States Patent [19]

Park

[11] Patent Number: 4,741,957

[45] Date of Patent: May 3, 1988

[54] HEAT SEALABLE MULTILAYER FILM AND METHOD OF MAKING SAME

[75] Inventor: Hee C. Park, Pittsford, N.Y.

[73] Assignee: Mobil Oil Corporation, New York, N.Y.

[21] Appl. No.: 902,555

[22] Filed: Sep. 2, 1986

[51] Int. Cl.$^4$ .............................................. B32B 27/00
[52] U.S. Cl. .................................. 428/349; 428/412; 428/476.3; 428/483; 428/516; 428/910
[58] Field of Search ............... 428/349, 516, 476.3, 428/412, 483

[56] References Cited

U.S. PATENT DOCUMENTS

| | | | |
|---|---|---|---|
| 3,442,686 | 5/1969 | Jones | 428/349 |
| 3,503,786 | 3/1970 | Barbehenn et al. | 428/349 |
| 4,284,672 | 8/1981 | Stillman | 428/349 |
| 4,297,415 | 10/1981 | Ward et al. | 428/349 |
| 4,341,825 | 7/1982 | Kemski | 428/349 |
| 4,384,024 | 5/1983 | Mitchell et al. | 428/349 |
| 4,419,411 | 12/1983 | Park | 428/349 |
| 4,439,478 | 3/1984 | Ferguson et al. | 428/349 |
| 4,488,924 | 12/1984 | Krieg | 428/349 |
| 4,564,558 | 1/1986 | Touhsaent | 428/349 |
| 4,604,324 | 8/1986 | Nahmais et al. | 428/349 |

*Primary Examiner*—Edith Buffalow
*Attorney, Agent, or Firm*—Alexander J. McKillop; Michael G. Gilman; Howard M. Flournoy

[57] ABSTRACT

An oriented polyolefin film structure having a base layer of, for example, polypropylene, and wherein at least one skin layer is comprised of a copolymer or terpolymer and at least one skin layer is comprised of a polyamide, polyester or polycarbonate polymer whereby said film structure has improved and broad heat sealability.

7 Claims, No Drawings

HEAT SEALABLE MULTILAYER FILM AND METHOD OF MAKING SAME

BACKGROUND OF THE INVENTION

This invention relates to production of broad heat sealable OPP film with excellent heat sealability and surface properties and to a method of making same.

In certain types of packaging, for example, foods such as cookies and the like, it is common to employ a multilayer film having two or more polymeric layers wherein one of the layers is known to be an effective heat seal layer. In the packaging process a supply of such a multilayer film can be shaped into a tube in a vertical and horizontal form, fill and seal machine. Marginal regions of heat seal layer are brought into face to face relationship and heat sealed together. Thereafter the packaging machine automatically forms a heat seal and makes a horizontal severence across the bottom of the bag; the product is dispensed into the open end of the tube and thereafter a second horizontal seal is effective across the tube with a simultaneous severing through the tube to result in a product packaged in a tube, heat sealed at both ends and along one seam at right angles to the end seals. While the food or other product is being dispensed into the package air is also present in the package and thus air assists in protecting and cushioning a product during subsequent shipment of the finished packages.

A multilayered wrapping film described in U.S. Pat. No. 4,214,039 discloses a film structure comprising a polyethylene film substrate having a heat sealable vinylidene chloride polymer, in between the polypropylene film and the vinylidene chloride polymer is a primer coat which enhances the bond strength between the polypropylene and the heat sealable vinylidene chloride polymer. This packaging is effective for comparatively small quantities of product. For packaging of comparatively large quantities its seal strength needs to be increased.

U.S. Pat. No. 4,564,558 is directed to an oriented multilayered heat sealable film structure of greater strength comprising a polyolefin film substrate, a layer of a terpolymer of ethylene, propylene and butene, a prime layer on said terpolymer layer and a heat sealable layer on said primer layer.

The packaging industry has been moving toward higher productivity requiringa broad heat sealable film. Also required in the field application is an excellent film surface for lamination and printing processes. This invention, therefore, relates to broad heat sealable film with excellent surface and barrier properties.

SUMMARY OF THE INVENTION

In accordance with the present invention an oriented PP film with excellent surface and barrier properties is provided comprising a heat sealable multilayer film structure having (a) a substrate comprising a polyolefin film; (b) a heat sealable layer on at least one surface of (a) consisting essentially of a low temperature melting resin having a low softening point, high seal and hot tack strength and (c) a high surface active layer on at least one surface of (a) selected from the group consisting of high temperature stable polymers. The present invention, therefore, evolves around a three-layer coextruded base film and the making thereof.

The method of producing the heat sealable multilayered film structures of the present invention comprises: coextruding a substrate comprising a polyolefin film with a layer consisting essentially of a copolymer or terpolymer respectively of ethylene-propylene or ethylene-propylene-butene and the like and a heat sealable layer of a high temperature stable polymer group selected from such as polyamides, polyesters and polycarbonates.

The layers may be described as A layer, B layer and C layer. B is the substrate or core layer, A and C are the outer or skin layers. The key requirements are that the A layer has a low softening point, high seal and hot tack strengths; the B layer which is low cost, has excellent use and functionality and the C layer contains a high temperature stable polymer group which not only provides high thermal stability but also imparts to the film desirable surface properties making its chemical nature highly suitable for lamination and printing operations.

The three layer coextruded composite is cast on a chill roll/water bath quenching unit and reheated on heated MDO rolls for MD orientation. The sticking and/or marking on the MDO rolls for softer heat seal layer can be avoided by cooling and heating, the alternate MDO rolls facing A layer and C layer, respectively. The MD oriented web is then subjected to TD orientation, treated when needed and wound on the winder.

DESCRIPTION OF PREFERRED EMBODIMENTS

The polyolefins contemplated as the substrate or core material of the present film structure include polyethylene, polypropylene, polybutene and copolymers and blends thereof. Particularly preferred is an isotactic polypropylene homopolymer having an isotacticity greater than 90. It is preferred that the polypropylene have a melt flow rate of from about 1.5 to 8 g/10 minutes.

As stated hereinabove the skin layer or layer A consists of low temperature melting resins. Preferred are E/P random copolymers and E/P/B terpolymer and blends thereof in any suitable proportions.

Ethylene-propylene random copolymer contemplated for use herein are conveniently formed by the simultaneous polymerization of the respective monomers. Effective formation of a random copolymer of ethylene and propylene is accomplished when the ethylene is present simultaneously with the propylene in an amount sufficient to result in from about 2.5 to about 8% and preferably 3-6% by weight of ethylene in the resulting copolymer. This system is characterized by random placement of the respective monomer units along the polymer chain. This is in contrast with a block copolymer of ethylene and propylene formed by sequential polymerization of the respective monomers. The feeding off the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer. The terpolymers [ethylene-propylene-butene (preferably butene-1)] can be made by any convenient method known to the art, e.g., Ziegler-Natta catalysis, and generally have an ethylene content of from about 0.5 to 8%, preferably 3-6 wt.%, and a butene content of from about 0.5-6 wt.% and preferably 1.5-4.5%. The terpolymers can have a melt flow rate at 446° F. of from about 3 to 15 and preferably 5 to 10.

Layer C consists of highly surface active and high temperature stable polymer groups including polyamide, polyethylene terephthalate (PET) and polycarbonate are prepared in general polycondensation processes. PET is the product of a condensation reaction between ethylene glycol and ethylene terephthalic acid. Polycarbonate may be prepared from aliphatic and cycloaliphatic diols by transesterification with diethyl carbonate. The polymer groups, however, may be prepared in any convenient manner known to the art. These groups, in particular, have high surface tension so they can be coated, printed, laminated or metallized without corona discharge treatment. These added benefits make the present invention more versatile in the flexible packaging applications.

In preparing the multilayer structure of the present invention the polypropylene (B layer) and layers A and C are coextruded so that layer A has a thickness from about 3 to about 20 percent of the total thickness of the three layers; layer B has a thickness of from about 60 to about 90 percent of the total thickness, and layer C has a thickness of from about 7 to 20 percent of the total thickness.

It has been found that some of the high temperature stable polymer groups contemplated herein do not adhere well to polyolefin film surfaces even when the latter have been subjected to well known pretreatment operations such as, for example, treatment by corona discharge, flame or oxidizing chemicals. Even in the case of coextrusion when both surfaces contact intimately at melt state, melt diffusion through interface is not enough to obtain a strong bond. It has also been found that the use of certain additives or adhesive resins between the polypropylene and high temperature stable layer provides an unexpectedly high level of adherence. As a result, such layers adhere to an adjacent layer with unexpectedly high tenacity. Optionally, therefore, the film structure may include suitable additive or adhesive material. It has been further found that in the case of combining the web outside of the die selected primers intermediate between the C and the B layers provide an unexpectedly high level of adherence.

The system contemplated for the formation of the multi-layer packaging material of the present invention involves the use of two layers applied in succession or simultaneously to the surface of the chosen substrate layer. For example, when the substrate layer is polypropylene, one or both surfaces of the polypropylene film will have applied thereto the following layers progressing in order outwardly from the surface of the polypropylene: A coextruded layer of terpolymer, an appropriate primer material to create a bond between the terpolymer and a surface heat seal layer, and the heat seal layer itself.

Examples of primer materials include those defined in U.K. Pat. No. 1,134,876 which discloses a primer produced by condensing a monoaldehyde with an interpolymer of acrylamide or methacrylamide and at least one other unsaturated monomer; and those defined in U.S. Pat. No. 1,174,328 which discloses a material resulting from condensing aminoaldehyde with acrylamide or methacrylamide and subsequently interpolymerizing the condensation product with at least one other unsaturated monomer in the presence of a $C_1$–$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

The films according to the following examples, as representative of the present invention, have a core of polypropylene and the defined skin layer blends on both sides thereof. It is understood, however, that structures with but a single skin or structures with more than two skins may be formed.

EXAMPLE 1

A polypropylene homopolymer of comparatively high stereoregularity (MP 165° C. and a melt flow rate of 4.5) was melted and coextruded with an ethylene-propylene-butene-1 terpolymer (MP 126° C. and a melt flow rate of 6) forming a three-layer coextruded structure. The coextrudate was then quenched, reheated and oriented biaxially, five times in the machine direction and nine times in the transverse direction. Subsequently, one surface of the skin layers was corona treated in a conventional manner. The total guage of the structure was 1.25 mil with a 0.06 mil each skin layer encapsulating the core layer (ABA structure).

Data showing heat sealability and receptivity for water-based inks and adhesions are summarized in the accompanying Table. The heat seal range measured between initial seal activation temperature to film distortion is good at about 60° F. Wet-out for water-based inks and adhesives are good. The adhesion strength, however, is not sufficient.

EXAMPLE 2

The procedure of Example 1 was substantially repeated except that the third layer (C) comprised the same polypropylene homopolymer employed in the core (B) layer. The thickness of the heat seal layer (A) was about 0.06 mil of the total guage of 1.25 mil (ABB structure).

Good sealability is shown. However, wet-out and adhesion for water-based inks and adhesives are unacceptable for converting the packaging operations.

EXAMPLE 3

The procedure of Example 2 was followed except that the third layer (C) comprised of a PET (polyethylene terephthalate) (MP 245° C. and an intrinsic viscosity of 0.74), condensation polymer produced from dimethyl terephthalate and ethylene glycol. The total guage of the structure was 1.25 mil, the first (heat seal layer A) and second (PET layer C) skins comprising 0.06 and 0.25 mil respectively (ABC structure).

As shown in the Table, distortion temperature is considerably higher than those in the previous examples. Consequently, the heat seal range has been broadened significantly permitting the packaging operation at much higher speeds.

TABLE

| | Example 1 | Example 2 | Example 3 |
|---|---|---|---|
| Crimp Seal Strength (20 psi, ¾ sec) A layer/A layer | | | |
| 220° F. | 313 | 395 | 345 |
| 240 | 535 | 585 | 643 |
| 260 | 510 | 488 | 540 |
| 280 | 528 | 470 | 585 |
| 300 | Severe Distortion | Distortion | 605 |
| 320 | | | 590 |
| 340 | | | Distortion |
| Receptivity of layer (C) for water-based inks and adhesives | Good wet-out and fair adhesion | Poor wet out and poor adhesion | Excellent wet-out and good adhesion |

As the above indicated data clearly shows, the films in accordance with this invention have excellent broad heat sealability and surface properties.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An improved oriented broad heat sealable three-layer coextruded structure comprising:
   (a) a heat sealable layer consisting essentially of a low temperature melting resin having a low softening point, high seal and hot tack strength on at least one surface;
   (b) a substrate comprising a polyolefin and
   (c) a surface active layer on at least one surface of (b) selected from high temperature stable polymers and wherein (a) has a thickness varying from about 3 to about 20 wt.% of the layered film structure, (b) has a thickness of from about 60 to about 90 percent of the total layered film structure and (c) has a thickness varying from about 7 to about 20 wt.% of the layered film structure.

2. The structure of claim 1 wherein said polyolefin comprises homopolymer polypropylene.

3. The structure of claim 1 wherein said low temperature melting resin (a) is selected from copolymers, terpolymers and mixtures thereof.

4. The structure of claim 3 wherein said resin is selected from the group consisting of ethylene/propylene random copolymers and ethylene/propylene/butene terpolymers.

5. The structure of claim 1 wherein the high temperature polymer (c) is selected from polymers having polyamide, polyethylene terphthalate or polycarbonate groups.

6. The structure of claim 1 having an orientation greater than 4 times.

7. The structure of claim 2 wherein (a) is an ethylene/propylene/butene-1 terpolymer and (c) is a polyethylene terephthalate polymer.

* * * * *